Jan. 17, 1956　　　C. M. HATHAWAY　　　2,731,198
PRINCIPAL STRAIN COMPUTERS

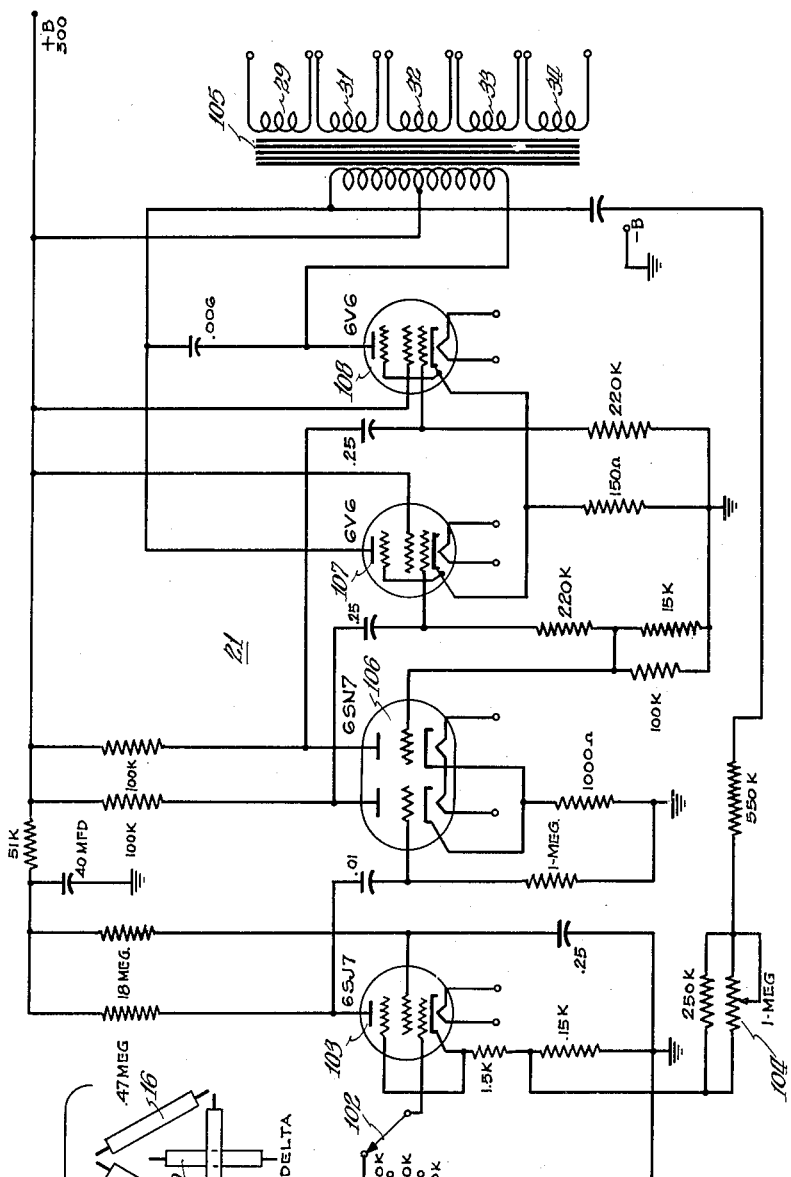
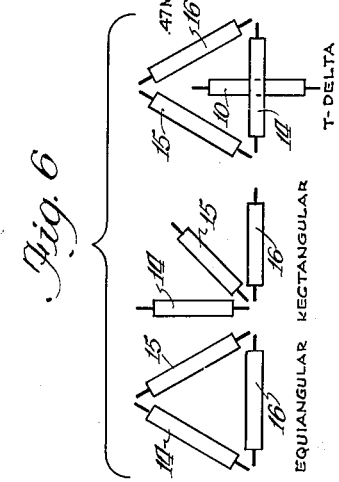

Filed Aug. 22, 1951　　　　　　　　　　　　5 Sheets-Sheet 4

Inventor:
Claude M. Hathaway
By: Alois W Graf
Attorney

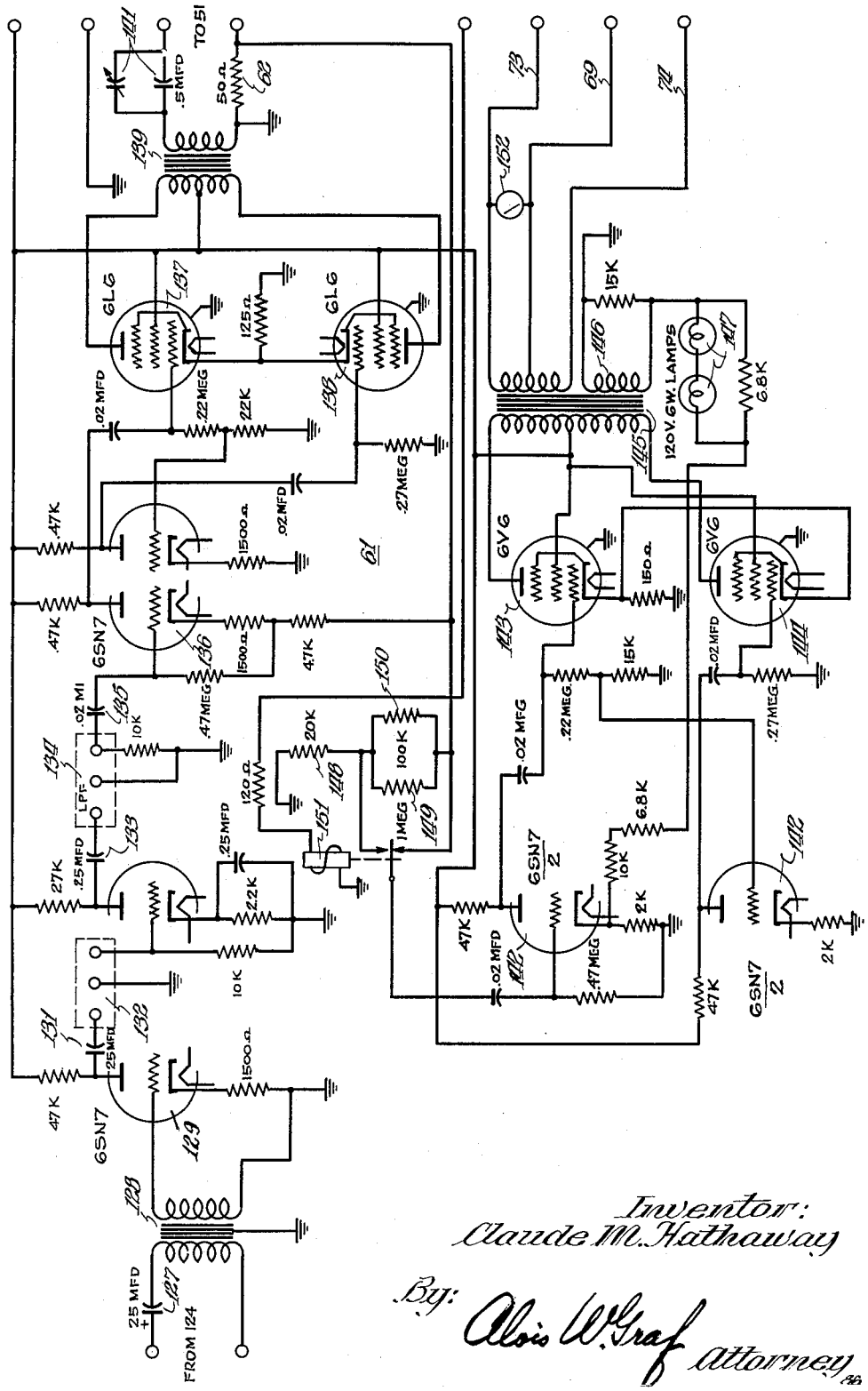

United States Patent Office 2,731,198
Patented Jan. 17, 1956

2,731,198

PRINCIPAL STRAIN COMPUTERS

Claude M. Hathaway, Denver, Colo., assignor to Hathaway Instrument Company, Denver, Colo., a corporation of Colorado Application August 22, 1951, Serial No. 243,147

10 Claims. (Cl. 235—61)

The present invention relates to a principal strain computer for strain gauge rosettes to indicate the magnitude, direction and sense of the major and minor principal strains existing in a stressed member.

In modern strain analysis resistance strain gauges are used in determining the stresses existing in a structure subjected to load. More commonly the resistance strain gauges comprise a grid of strain responsive resistance wire cemented to the structure. When the structure is stressed the strain in the member along the length of the gauge produces a proportional incremental resistance change therein. The strain in a member, however, may be due to a combination of tension, compression and shear stresses. Such combination produces in a two dimensional system a resultant major principal strain and a minor principal strain at right angles to each other. It is desired to determine the magnitude and direction of these principal strains.

Generally, three or more strain gauges are applied to a member in one of several simple geometric configurations known as rosettes. Each gauge is connected as one arm of a bridge circuit. The magnitude and direction of the major and minor principal strains existing in the stressed member may be computed directly from the output voltages of the individual strain gauge bridges. The equations which relate the strain gauge bridge output to the principal strains and angles are rather involved, thus requiring considerable laborious calculation. Where a large number of rosettes are employed as in making a stress analysis of a large structure the calculations involve a tremendous amount of time and labor. It, therefore, would be desirable to provide some arrangement whereby these equations are more readily solved.

In accordance with the present invention it is proposed to employ electronic means which are a form of an analogue computer in which voltages proportionate to the strains are supplied by the individual strain gauge bridges of the rosettes to the computing mechanism which operates on them to obtain voltages which are proportional to the major and minor principal strains and their angles. Furthermore, in accordance with the present invention, an indicator is provided giving a result directly in strain or degrees of rotation so that there is no need of knowing the individual strain gauge indications.

It, therefore, is an object of the present invention to provide an improved electronic computing system for solving an equation of strain.

A further object of the invention is to provide an improved electronic system for indicating the magnitude, direction and sense of the major and minor principal strains in a stressed member.

Still another object of the present invention is to provide for a strain computer and improved torque-balanced electrodynamometer.

Still another object of the invention is to provide an improved system for strain computation utilizing a torque-balanced electrodynamometer at low signal levels.

Other and further objects of the present invention subsequently will become apparent by reference to the following description taken in conjunction with the accompanying drawings:

Figure 2 is a circuit diagram of the gauge amplifier forming a part of the system shown in Figures 1 and 1a;

Figure 3 is a circuit diagram of the dynanometer amplifier forming a part of the system shown in Figures 1 and 1a;

Figure 4 is a circuit diagram of the dynamometer employed in Figures 1 and 1a;

Figure 5 is a figure 5 of the servo amplifier used in Figures 1 and 1a; and

Figure 6 shows three common modes of arranging strain gauges in rosettes.

Figure 1:
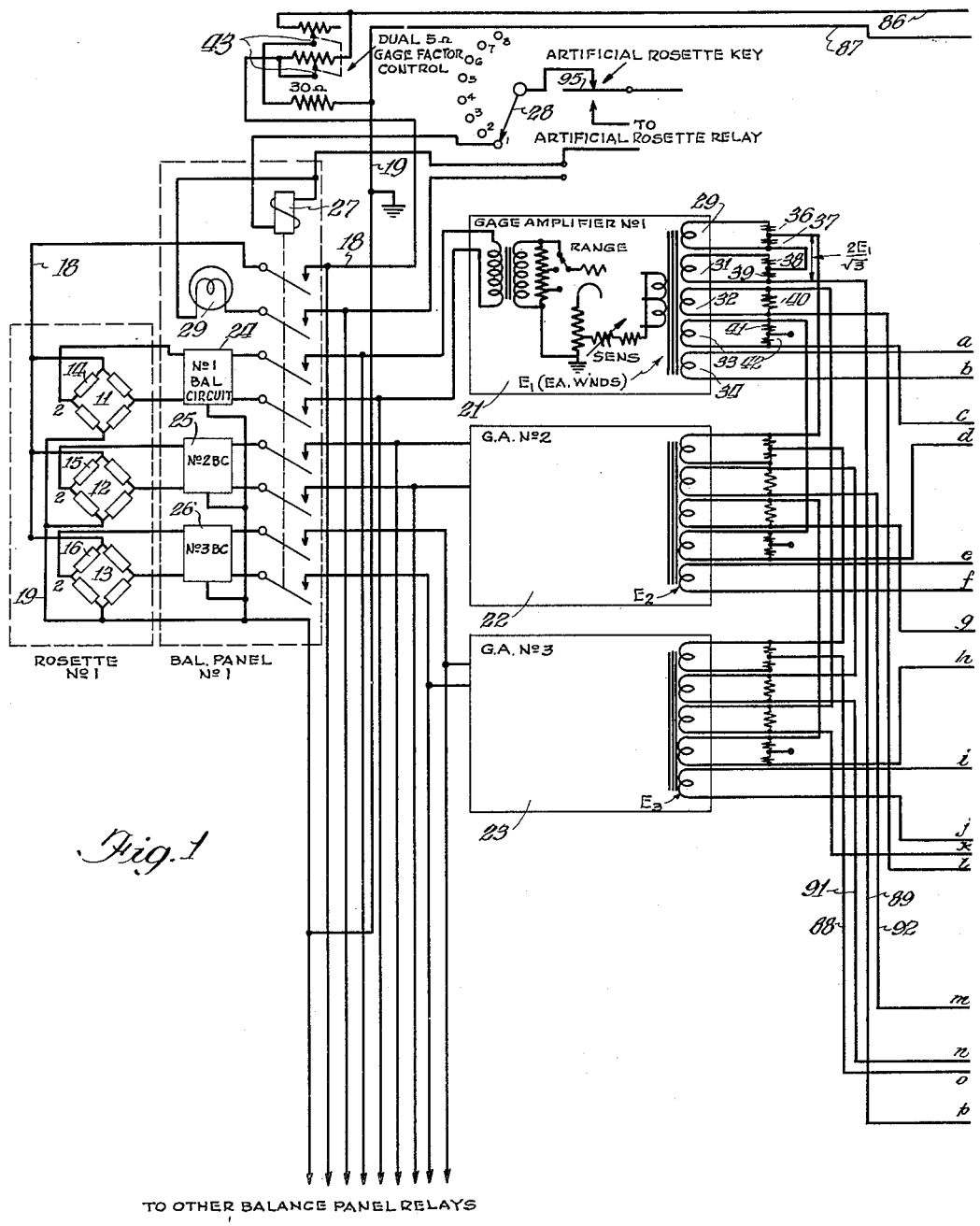
Figures 1 and 1a are a block diagram of the principal strain computer constructed in accordance with the principles of the present invention.
Figure 1A:
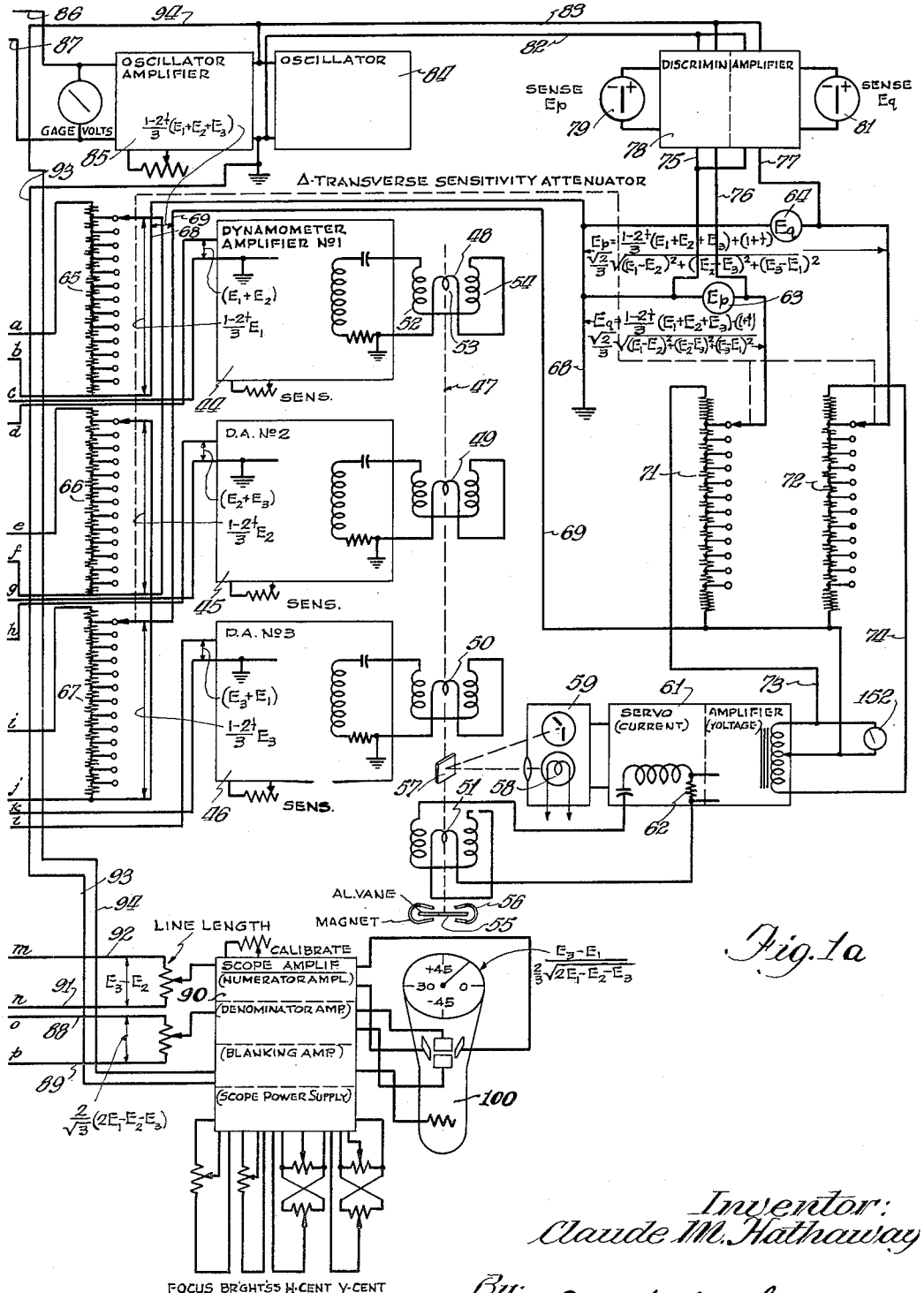

Figures 1 and 1a are a block diagram of a computer constructed in accordance with the principles of the present invention as connected for operation with strain gauge rosettes of delta configuration. Each of the strain gauge elements in the delta rosette is connected as one arm of a bridge circuit. Thus, in Figure 1, three bridge circuits 11, 12 and 13 have strain gauges 14, 15 and 16 as the variable arms thereof. Each of the bridge circuits is energized by a carrier current, which in one embodiment was 400 cycles, supplied by conductors 18 and 19. The outputs of the individual bridges are supplied to suitable amplifiers such as the gauge amplifiers 21, 22 and 23. The output of each of the bridges 11, 12 and 13 passes through one of a plurality of balancing circuits 24, 25 and 26 connected by suitable contacts controlled by a relay 27 to the various gauge amplifiers. Each balancing circuit contains a coarse and fine balancing control for both resistance and capacitance of the bridges. In the commercial embodiment the principal strain computer was arranged to provide the results, in rapid succession, of a total of forty-eight different rosettes. Suitable control switches were provided, such as the switch 28 for selecting a particular rosette and energizing a particular relay such as relay 27. A suitable signal lamp 29 is illuminated to indicate the particular rosette selected.

In operation each bridge of the rosette is carefully balanced before being subjected to strain. When strain is applied to the structure supporting the rosette a voltage is developed in each bridge which is substantially proportional to the axial strain for that gauge, which is either in-phase or in-phase opposition with respect to the 400 cycle bridge circuit carrier supplied voltage, depending upon whether the strain is tension or compression.

The output of each bridge is connected to the input of one of the gauge amplifiers 21, 22 or 23, each of which has five identical and isolated output channels. Thus, for example, gauge 21 has output channels 29, 31, 32, 33 and 34. By means of suitable resistors 36, 37, 38, 39, 40, 41, 42 and electrical connections the output voltages of each amplifier are suitably attenuated by the proper factors and added algebraically to obtain, (a) the first term of the principal strain equation, (b) the unsquared terms under the radical of the second term of the principal strain equation, and (c) the numerator and denominator of the angle equations.

By suitable control switches the system shown in Figures 1 and 1a can be arranged to solve the equation employed for the solution of the most commonly used three and four gauge rosettes, such as the equiangular, T-delta and rectangular, in accordance with the following formulas:

*Formula A.—Rectangular rosettes*

(1) $$E_p = \frac{1-t}{2}(e_1+e_3) + \frac{1-t}{\sqrt{2}}\sqrt{(e_1-e_2)^2+(e_2-e_3)^2}$$

(2) $$E_q = \frac{1-t}{2}(e_1+e_3) + \frac{1-t}{\sqrt{2}}\sqrt{(e_1-e_2)^2+(e_2-e_3)^2}$$

(3) $$\tan 2\theta = \frac{e_1+e_3-2e_2}{e_1-e_3}$$

*Formula B.—Equiangular rosettes*

(4) $$E_p = \frac{1-2t}{3}(e_1+e_2+e_3) + (1+t)\frac{\sqrt{2}}{3}\sqrt{(e_1-e_2)^2+(e_2-e_3)^2+(e_3-e_1)^2}$$

(5) $$E_q = \frac{1-2t}{3}(e_1+e_2+e_3) - (1+t)\frac{\sqrt{2}}{3}\sqrt{(e_1-e_2)^2+(e_2-e_3)^2+(e_3-e_1)^2}$$

(6) $$\tan 2\theta = \frac{\sqrt{3}(e_3-e_2)}{2e_1-e_2-e_3}$$

*Formula C.—T-delta rosettes*

(7) $$E_p = \frac{1-t}{2}(e_3+e_4)(1+t)\sqrt{\left(\frac{e_1-e_2}{\sqrt{3}}\right)^2+\left(\frac{e_3-e_4}{2}\right)^2}$$

(8) $$E_q = \frac{1-t}{2}(e_3+e_4) - (1+t)\sqrt{\left(\frac{e_1-e_2}{\sqrt{3}}\right)^2+\left(\frac{e_3-e_4}{2}\right)^2}$$

(9) $$\tan 2\theta = \frac{\sqrt{3}(e_3-e_2)}{2e_1-e_2-e_3}$$

The symbols used in the above equations are as follows:

$E_p$ = voltage proportional to the major principal strain
$E_q$ = voltage proportional to the minor principal strain
$\theta$ = angle of the major principal strain, measured counterclockwise from gage 1
$e_1$ = voltage developed in strain gage 1 due to strain
$e_2$ = voltage developed in strain gage 2 due to strain
$e_3$ = voltage developed in strain gage 3 due to strain
$e_4$ = voltage developed in strain gage 4 due to strain
$t$ = transverse sensitivity factor of the strain gages of the rosette, defined as the ratio of response of the gage to pure transverse to its response to pure longitudinal strain. The foregoing formulae were developed in "Practical Reduction Formulas for Use on Bonded Wire Strain Gauges in Two Dimensional Stress Fields," R. Baumberger and F. Hines. "Experimental Stress Analysis" volume II, No. 1, copyright 1944, page 113.

The second term of a principal strain equation which involves the square root of the sum of the squares of two or three terms is obtained as follows:

Each of the unsquared terms which appear under the radical is fed to an amplifier which produces a current proportional to the input voltage. The various voltages obtained from the gauge amplifier are individually attenuated by the appropriate factor (when $t$ is involved); this is selected by means of a switch 43. By the use of in-phase series connections additions are obtained, and by out-of-phase series connections, subtractions are obtained. Thus there may be obtained complete selections of a part of a strain equation required by the radical term.

The complete selection of that part of the strain equation involving the square root of the sum of the squares of additional sum and difference terms and also the sum and differences of $e$ terms, each multiplied by a common factor, is obtained by the operation of a four element torque-balanced electrodynomometer operating in a servo system.

The voltages corresponding to the terms appearing under the radical, obtained as previously described, are each fed to a dynamometer amplifier, such as the amplifiers 44, 45 and 46. Each dynamometer amplifier 44, 45 and 46 develops a current in one of the elements of the dynamometer 47 which is proportional to the voltage developed for that term. An electrodynamometer 47 comprises four elements 48, 49, 50 and 51 mounted on a single shaft. Each of the elements 48, 49, 50 and 51 consists of three coils. Thus, the element 48 has coils 52, 53, and 54 connected in series and energized from the dynamometer amplifier 44. The coils of the element 49 are energized from the dynamometer amplifier 45 and, similarly, the coils of the element 50 are energized from the dynamometer amplifier 46. The coils of the element 51 are energized from a source subsequently to be described. Mounted upon the shaft of the dynamometer 47 is an aluminum vane 55 arranged to move within a strong magnetic field supplied by one or more permanent magnets 56. Suitable limit stops are also provided for the shaft of the dynamometer 47 to preclude movement thereof to such a degree as to subsequently cause it to be inoperative. In the element 48 of the dynamometer 47, two of the coils 52 and 54 are stationary or fixed, whereas, the coil 53 is mounted on a rotatable shaft so as to move between the field produced by the stationary or fixed coils. These coils tend to produce torque or rotation of the shaft of the dynamometer in one direction. The element 51 is so arranged that when energized it produces a torque in opposition thereto. Mounted upon the shaft of the dynamometer 47 is a small mirror which controls the operation of the servo system.

A suitable light source 58 is focused upon the mirror 57 so that under certain conditions the light therefrom is reflected to a photocell 59. The dynamometer is so arranged that a small rotation of the shaft by the elements 48 to 50 causes the mirror to direct light onto the photocell 59. The output of the photocell is fed to a pre-amplifier and an amplifier forming a part of a system designed to produce appreciable 400 cycle current when the photocells 59 are fully illuminated. When the photocells 59 are dark the output of this system is substantially zero. This 400 cycle current produced as a result of the photocell amplifier action is supplied to the fourth element 51 of the dynamometer.

The photocell 59 is a composite anode cathode type, such as a 5652 tube. The output of this tube is supplied to the grid of the cathode follower pre-amplifier. The output of this amplifier is at a low impedance suitable for feeding the current to a line. Proper balancing controls are provided to balance out the dark current and capacitive conductance of the photo tube when the light is removed therefrom. The servo amplifier 61 actually consists of two individual amplifiers on a single chassis. The first amplifier is the pre-amplifier and the second amplifier develops a current proportional to a resistor 62 connected in series with the element 51 of the dynamometer 47. The voltage thus obtained becomes the square root of the sum of the squares of the voltages on the inputs of the three dynamometer amplifiers 44, 45 and 56.

It will be appreciated that the torque produced on the shaft of the dynamometer 47 by the element 51 opposes the torque in the other three or computing elements 48, 49 and 50 of the dynamometer. Therefore, the current in the fourth element 51 of the dynamometer is proportional to the square root of the sum of the squares of the currents in the other elements and, hence, the voltage developed across the resistor 62 is proportional thereto or, in other words, proportional to the terms appearing between the radical.

This voltage drop is amplified and attenuated by the proper factor (which also involves an adjustable $t$ factor) to obtain the complete portion of the term of the strain equation. The output of the servo amplifier is obtained from a center tapped transformer to obtain a positive or negative term by virtue of the phase rotation of each winding half with respect to the center tap. These term voltages are then added to and subtracted from the voltages developed for the first term of the principal strain equation to obtain voltages proportional to the major and minor principal strains. The voltages thus obtained are used to actuate major and minor principal strain indicating instruments, such as the instruments 63 and 64. It will be noted that the fifth output winding of each of the gauge amplifiers 21, 22 and 23 corresponding to the output winding 34 of the amplifier 21 is connected to a resistor bank, such as resistor banks 65, 66 and 67, respectively. In the particular arrangement shown in Figure 1 an output is obtained from each of these banks which is equal to $$\frac{1-2t}{3} \times E$$

From these banks of resistors 65, 66 and 67 a potential is supplied to the conductors 68 and 69 which is equal to $$\frac{1-2t}{3} \times (E_1+E_2+E_3)$$

It will be noted that the conductor 69 extends to the mid tap of the output transformer of the servo amplifier 61 and also to two resistor banks 71 and 72, which have adjustable contacts connected to the indicating meters 63 and 64. The other extremities of the resistor banks 71 and 72 are connected by conductors 73 and 74 to the outer terminals of the output transformer of the servo amplifier 61. Accordingly, a voltage proportional to the principal strain appears between conductors 75 and 76. Any voltage proportional to the minor strain appears between the conductors 75 and 77.

Since the major and minor principal strain may be either tension or compression, it is necessary to indicate their sense. This is done by applying the voltages developed for the major and minor principal strains appearing between the conductors 75 and 76, and 75 and 77, respectively, to an amplifier discriminator unit 78 which produces a direct current output voltage having a polarity depending upon the phase $E_p$ and $E_q$ with respect to the gauge voltage. For each of the major and minor strains a separate sense meter is provided and, hence, a meter 79 indicates the sense of $E_p$ and another meter 81 indicates the sense of $E_q$. The discriminator amplifier also receives voltage from a pair of conductors 82 and 83 which are connected to an oscillator 84. The oscillator 84 also supplies energy to an amplifier 85 which supplies energy to a pair of conductors 86 and 87 leading to the gauge factor control 43.

The expression for the angle of the plane of the major principal strain is given as a ratio of sum and difference terms equal to tan $2\theta$. This is solved by amplifying both voltages developed for the numerator and denominator. The voltages for the denominator appear between the conductors 88 and 89 and are supplied to one portion of a scope amplifier 90. The voltages for the numerator appear between the conductors 91 and 92 and are supplied to another portion of the scope amplifier 90. These amplifier voltages are applied to the vertical and horizontal deflection plates, respectively, of a cathode ray oscilloscope tube 100. Since the voltages are either in-phase or are in-phase opposition, the resultant Lissajous figure is a straight line, the absolute angular position of which is that of an angle having a tangent numerically equal to the ratio.

However, since the same angular position of the line would be obtained for ratios of $+1:+1$ as for $-1:-1$, and also for $+1:-1$ as for $-1:+1$, a head and tail must be given to this pointer to avoid ambiguity. This is done by introducing a blanking voltage at the grid of the oscilloscope tube which is always in-phase with the gauge voltage supply. Accordingly, a portion of the gauge voltage supply is obtained by conductors 93 and 94 connected to the oscillator 84 which supply energy to the blanking amplifier portion of the scope amplifier 90. This, then, makes the line on the face of the cathode ray tube 100 originated in the center of the tube. An apparent rotation of the line about the center will be produced similar to a mechanical pointer with a pivot at the center of a circular scale. Accordingly, a dial is placed about the outside edge of the oscilloscope tube which is calibrated in degrees from zero to $-90°$ and from zero to $+90°$.

A key switch 95 is provided for connecting into circuit an artificial rosette. This serves to transfer the input of the computer from a selected rosette to a simulated rosette which consists of four bridges complete with balancing controls. By means of the balancing controls simulated strains may be set up so that the operation of the computer may be checked by comparing readings with calculated values. The accuracy of the simulated strains is about 1%.

Figure 2 shows a circuit diagram for the gauge amplifier. As previously mentioned, each of the gauge amplifiers 21, 22 and 23 is the same. Thus, the amplifier 21 has an input transformer 101 having its primary winding connected through the contacts of the relay 27 of Figure 1 to the balancing circuit 24. The secondary winding of the transformer 101 is connected across a plurality of resistors arranged in series having their junctures connected to the contacts of a selector switch 102 whereby the range of the amplifier may be determined. The switch 102 is connected to the grid of the input vaccum tube 103. The cathode circuit of this vacuum tube includes adjustable resistor 104 whereby the sensitivity of the amplifier may be adjusted.

The amplifier 21 is a highly stabilized carrier frequency amplifier which delivers five independent and identical carrier voltages proportional to the gauge output voltage to the secondary windings 29, 31, 32, 33 and 34 of the transformer 105. The input tube 103 is followed by a dual tube 106 which controls the two output tubes 107 and 108. It will be noted that one terminal of the adjustable resistor 104 is connected to the primary winding of the transformer 105 and, hence, there is provided a controlled amount of negative feed back for stabilization. The control knob for the resistor 104 is, therefore, marked sensitivity. The switch 102 is marked range and has three positions which may be marked 1,000, 5,000 and 20,000 to indicate that the change in the overall amplifier gain varies as 1, ⅕ and ¹⁄₂₀ of the calibrated value of the three positions, respectively. The setting of the switches 102, therefore, determines the range of the computer.

In the circuit diagram of Figure 2 there has been indicated the value of each of the components employed and the types of tubes used in an embodiment of the invention. It is believed that those skilled in the art can readily ascertain the mode of construction of this amplifier from the typical component values given and the circuit arrangement shown, so that no detailed description thereof need here be given. It, of course, will also be apparent to those skilled in the art that the particular amplifier arrangement illustrated in Figure 2 may be changed without involving invention or changing the operation of the computer.

Figure 3:
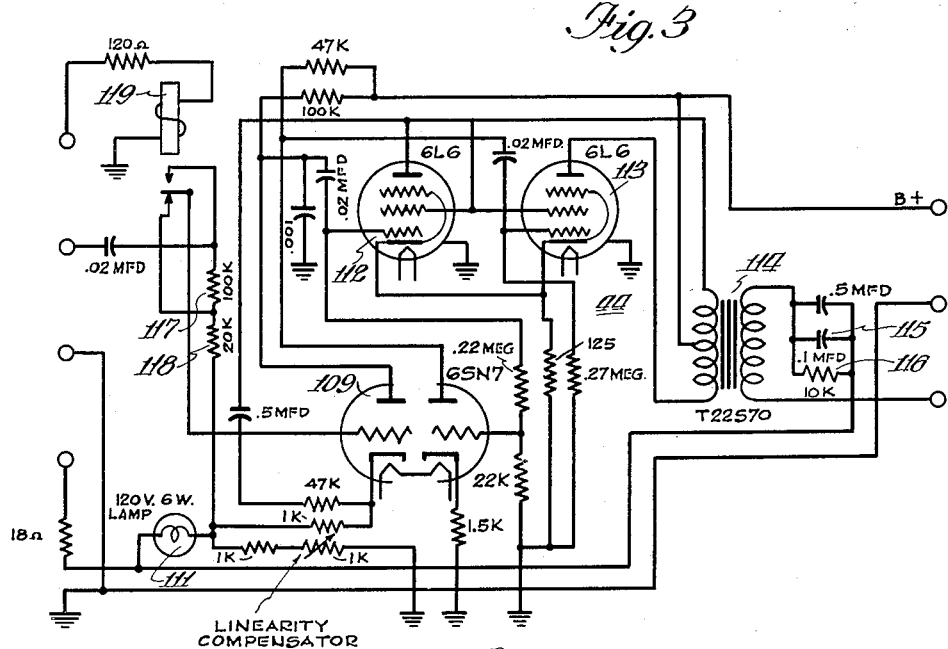

Figure 3 shows the circuit diagram of a typical dynamometer amplifier such as the amplifier 44. Each of the various dynamometer amplifiers 44, 45 and 46 are identical. These dynamometer amplifiers are power amplifiers arranged to deliver current into the element of the electrodynamometer 47 so that the power supplied is directly proportional to the input voltage. In this amplifier current feed back is employed for stabilization. As shown in Figure 3 the input tube 109 has a cathode circuit which includes a nonlinear element 111 which in the particular circuit shown was a 6 watt 120 volt incandescent lamp. Because the output circuit is reactive at all frequencies except 400 cycles, the feed back circuit which can be employed without instability is limited and, hence, the lamp employed in the feed back serves to compensate for the inherent nonlinearity amplifier at high power output levels. The input tube 109 supplies power to two output tubes 112 and 113, which energizes the transformer 114. The secondary winding of the transformer 114 is connected in a circuit having a capacitor 115 and a resistor 116 in parallel so that the inductance of the dynamometer element at 400 cycles may be balanced out. For certain operations subsequently to be described, it is desired to change the sensitivity of this amplifier by a factor of six times. This is accomplished by means of a precision voltage divider including two resistors 117 and 118 connected in a circuit controlled by a relay 119. The relay energized by an external circuit, therefore, can change the sensitivity of the amplifier by a factor of six.

As was the case in the previous figure, values of circuit components have been given so that those skilled in the art can readily determine the operation of the amplifier. Detailed description thereof is not deemed necessary in the present instance.

Figure 4:
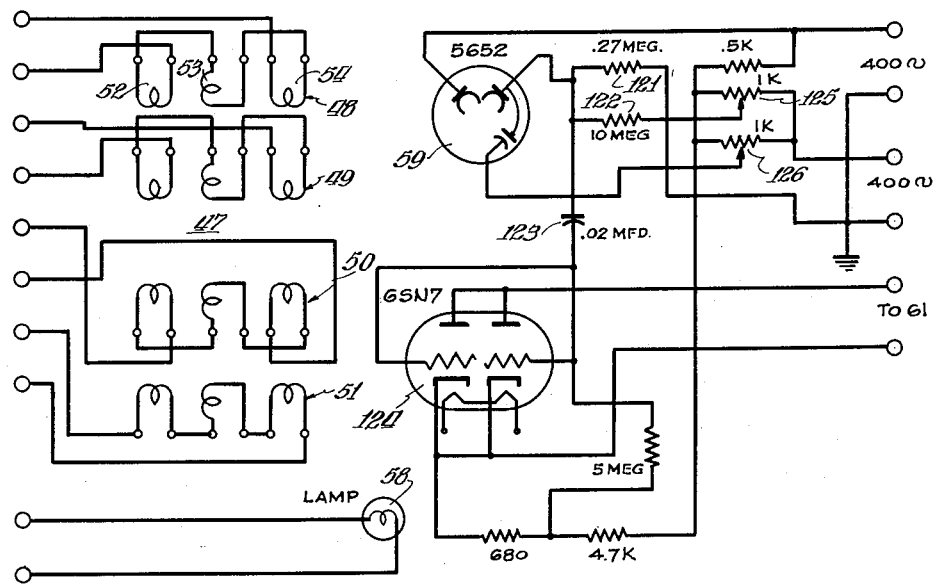

The electrodynamometer is shown schematically in Figure 4, together with the light source, the photocell and its cathode follower amplifier. The photocell 59, which in one embodiment was of the type 5652, is a composite anode cathode tube. It is supplied with a potential of 2½ volts at 400 cycles. Across its load resistor there is developed a 400 cycle potential having a magnitude and dependent upon the light on the composite cathode anodes. Thus, the potential development across the resistors 121 and 122 supplied through a coupling capacitor 123 to the grids of the vacuum tube 124 which in one embodiment was a 6SN7 tube arranged between both triode elements in parallel. The cathode follower 124 is employed to obtain an impedance level suitable for transferring this voltage to the input of the servo amplifier 61.

One volt of 400 cycles in-phase opposition to the photocell supply potential is applied to adjustable resistors 125 and 126 to balance out the tube dark currents and internal capacitance.

The output of the circuit shown in Figure 4 is supplied to the servo amplifier shown in Figure 5. This potential is supplied through a coupling capacitor 127 to a transformer 128 having its secondary winding connected to the input of one triode portion of a vacuum tube 120, which may be a 6SN7 tube. The first triode portion of this tube is connected through a coupling capacitor 131 and a high pass filter 132 to the second triode portion. The output of the second triode portion of the vacuum tube 129 is coupled through a capacitor 133 and a low pass filter 134 and another capacitor 135 to the input of the first triode portion of a vacuum tube 136. The second triode portion of the vacuum tube 136 acts as a phase reversal or balancing tube so that the output of the vacuum tube 136 can be supplied to a push-pull amplifier employing vacuum tubes 137 and 138. These latter vacuum tubes energize a transformer 139. The secondary winding of the transformer 139 is connected in a circuit containing balancing capacitors 141 which are used to balance out the inductance of the dynamometer coil at 400 cycles. The resistor 62 in series with the secondary winding of the transformer 139 develops a potential which is supplied to the second section of the amplifier to energize the balancing coil of the electrodynamometer. The two filters 132 and 134 effectively remove the 60 cycle component and the harmonics of 400 cycles from the output of the photocell pickup device while securing substantial gain and maintaining a minimum phase shift at about 400 cycles. The second portion of the amplifier shown in Figure 5 comprises a medium gain amplifier having a high degree of feed back for stabilization. The feed back loop contains a nonlinear element to minimize the inherent nonlinearity of the amplifier due to the harmonic content at high input levels. The potential developed across the resistor 62 is supplied to the two triode portions of a vacuum tube 142 which operate as an amplifier phase inverter to energize push-pull amplifier vacuum tubes 143 and 144 supplying energy to a transformer 145. One of the secondary windings of the transformer 145 is provided with a mid tap so that this winding is connected to the conductors 69, 73 and 74, also shown in Figure 1a. The transformer 145 is provided with an auxiliary winding 146 which supplies potential through nonlinear elements comprising a pair of lamps 147 in the feed back circuit. This latter amplifier, therefore, supplies the current which is the equivalent of the square root of the sum of the squares of the voltages on the inputs of the three dynamometer amplifiers.

It will be noted that the voltage appearing across the resistor 62 of the first amplifier shown in Figure 5 is supplied across a voltage divider network comprising three resistors 148, 149 and 150. These resistors are connected to the contacts of a relay 151 having a movable contact connected to the input circuit of the vacuum tube 142 of the second amplifier. The relay 151 is arranged to be operated simultaneously with the relay 119 of Figure 3.

Since the torque of the electrodynamometer is proportional to the square of the current, it has been found that it cannot be used with accuracy when the second term of the strain equation is below about 10% of maximum. It, furthermore, will be appreciated that erratic operation of the electrodynamometer may be caused by friction at such low signal levels since a voltage of 10% of maximum represents a dynamometer power level of only 1% of the maximum since this is a square law instrument. In Figure 1a and Figure 5 there is shown a power level meter 152 for the servo amplifier which indicates the output voltage of the amplifier and by a suitable mark on the lower end of its scale warns the operator that the operation of a dynamometer servo system is below the standard of accuracy desired. To provide for a range wherein the conditions for the second term of the equation are small, a suitable switch not shown on the control panel for the operator is actuated to increase the current gain of the dynamometer amplifiers 44, 45 and 46 by a factor of six, and to decrease the voltage gain of the voltage amplifier forming the second amplifier portion of Figure 5 and the servo amplifier 61 by six times. This, in effect, raises the power level of the dynamometer by thirty-six times. Thus, there is obtained an accurate value for the second term of the strain equation.

The level meter 152 also may be provided with a reference mark at the upper end of its scale to indicate that the servo system is overloaded and that the gauge amplifier range switches, such as the switch 102 of Figure 2 should be turned to a higher range. Thus, it becomes apparent that the usefulness of the present computer is extended appreciably.

In the previously described figures, the circuit diagrams indicate values for the various components as embodied in a particular commercial device. Since many of the amplifier circuits are in accordance with conventional engineering practice it is not deemed necessary to describe the circuits in detail. For clarity in presentation, emphasis, therefore, has been directed only to those features which are unique and contribute to the patentability of the invention. Those skilled in the art will appreciate that other amplifying circuits may be substituted as long as the ultimate result obtained is comparable to the result obtained by the circuits shown. While it has been convenient in setting forth the invention to illustrate it by certain circuit arrangements and indicating certain circuit components it, therefore, will be appreciated that the invention is susceptible to variations and is not to be limited thereby, but is entitled to an interpretation commensurate with the spirit and scope of the invention defined in the accompanying claims.

I claim:

1. A strain computer for a rosette of at least three strain gauges comprising an amplifier for each strain gauge to produce a plurality of identical voltages proportional to the strain in the gauge, circuit means for attenuating and algebraically combining certain of the voltages for each gauge to produce for each gauge a first resultant voltage, means for electrodynamically combining said first resultant voltages to obtain the sum of the squares of said first resultant voltages, means for generating a second resultant voltage equal to the square root of the electrodynamically combined voltages, circuit means for attenuating and algebraically combining other voltages of all of said gauges to produce a third resultant voltage and circuit means for algebraically combining the square root of said second resultant voltage and the third resultant voltage to produce a fourth resultant voltage proportional to the principal strain in said rosette.

2. A strain computer for a rosette of at least three strain gauges comprising an amplifier for each strain gauge to produce a plurality of identical voltages proportional to the strain in the gauge, circuit means for attenuating and algebraically combining certain of the voltages for each gauge to produce for each gauge a first resultant voltage, means for electrodynamically combining said first resultant voltages to obtain the addition of the squares of said first resultant voltages, means for generating a second resultant voltage equal to the square root of the electrodynamically combined voltages, circuit means for attenuating and algebraically combining other voltages of all of said gauges to produce a third resultant voltage, circuit means for algebraically combining said second and third resultant voltages to produce a fourth resultant voltage proportional to the principal strain in said rosette and means for comparing said fourth resultant voltage with a reference voltage to determine the sense of the strain.

3. The strain computer for a rosette of at least three strain gauges comprising an amplifier for each strain gauge to produce a plurality of identical voltages proportional to the strain in the gauge, circuit means for attenuating and algebraically combining certain of the voltages for each gauge to produce a resultant voltage for each gauge, means for electrodynamically squaring said first resultant voltages and adding said squared voltages, means for generating a second resultant voltage equal to the square root of the dynamically combined voltages, circuit means for attenuating and algebraically combining other voltages of all of said gauges to produce a third resultant voltage, and circuit means for algebraically combining said second and third resultant voltages to produce a fourth resultant voltage proportional to the minor strain in said rosette.

4. The strain computer for a rosette of a least three strain gauges comprising an amplifier for each strain gauge to produce a plurality of identical voltages proportional to the strain in the gauge, circuit means for attenuating and algebraically combining certain of the voltages for each gauge to produce a resultant voltage for each gauge, means for electrodynamically squaring said first resultant voltages and adding said squared voltages, means for generating a second resultant voltage equal to the square root of the dynamically combined voltages, circuit means for attenuating and algebraically combining other voltages of all of said gauges to produce a third resultant voltage, circuit means for algebraically combining said second and third resultant voltages to produce a fourth resultant voltage proportional to the minor strain in said rosette and means for comparing the fourth resultant voltage with a reference voltage to determine the sense of the strain.

5. A strain computer for a rosette of at least three strain gauges comprising a bridge circuit, a source of alternating current therefor, an amplifier for each strain gauge to produce a plurality of voltages proportional to the strain in the gauge, circuit means for attenuating and algebraically combining certain of the voltages for each gauge to produce the first resultant voltage for each gauge, means for electrodynamically combining said first resultant voltages, means for generating a second resultant voltage equal to that of the electrodynamically combined voltages including photoelectric means responsive to the torque produced in said electrodynamic means by said first resultant voltages, circuit means for attenuating and algebraically combining other voltages of all of said gauges to produce a third resultant voltage, circuit means for algebraically combining said second and third resultant voltages to produce fourth and fifth resultant voltages proportional to the major and minor strains in said rosette, and means for comparing the fourth and fifth resultant voltages with a reference voltage to determine the sense of each strain.

6. A strain computer of a rosette for at least three strain gauges comprising a bridge circuit, an amplifier for each strain gauge to produce a plurality of voltages proportional to the strain in the gauge, a source of alternating current for said bridge circuits, circuit means for attenuating and algebraically combining certain of the voltages for each gauge to produce a first resultant voltage for each gauge, an amplifier for said voltage, means for electrodynamically combining said first resultant voltages, means for generating a second resultant voltage equal to that of the electrodynamically combined voltages including photoelectric means and an amplifier responsive to the torque produced in said electrodynamic combining means, means for increasing the amplification of said first amplifier and for decreasing the amplification of said second amplifier for low signal voltages obtained from said gauges when strain therein is small, circuit means for attenuating and algebraically combining other voltages of all of said gauges to produce a third resultant voltage, and circuit means for algebraically combining said second and third resultant voltages to produce a fourth resultant voltage proportional to the principal strain in said rosette and a fifth resultant voltage proportional to the minor strain in said rosette.

7. In a system for solving an equation having two terms for the strain in a rosette of strain gauges, the combination comprising a plurality of amplifiers each connected to a strain gauge of said rosette to provide a plurality of identical electrical quantities each proportional to the strain on one gauge of said rosette, circuit means for attenuating and algebraically combining certain proportions of said electrical quantities proportional to the strain on said strain gauges to obtain an electrical quantity proportional to the first term of said equation, circuit means for attenuating and algebraically combining certain other portions of said electrical quantities of said strain gauges to provide for each gauge an electrical quantity proportional to a part of the second term of said equation, electrodynamic means for obtaining the sum of the squares of said latter electrical quantities, means for generating an electrical quantity for electrodynamically opposing said electrodynamically combined quantities to obtain an electrical quantity equal to the square root of the algebraic sum of said latter quantities, circuit means for combining algebraically said last quantity with said quantity representing the first term of said equation, and means for indicating the result.

8. In a system for solving an equation having two terms for the strain in a rosette of strain gauges comprising a plurality of amplifiers each connected to a strain gauge to provide a plurality of electrical quantities proportional to the strains on individual gauges of said rosette, circuit means for attenuating and algebraically combining certain proportions of said plurality of electrical voltages representative of said strain gauges to obtain a first resultant voltage proportional to the first term of said equation, circuit means for attenuating and algebraically combining certain proportions of said electrical voltages representative of said strain gauges to obtain for each gauge a second resultant voltage which is proportional to a part of the second term of said equation, electrodynamic combining means for squaring said second resultant voltages and algebraically adding said squared voltages, means for generating an electrical voltage for electrodynamically opposing said combined voltages to obtain a third resultant voltage equal to the square root of the algebraic sum of said squared second resultant voltages, and circuit means for combining algebraically said third resultant voltage with said first resultant voltage.

9. In a system for solving an equation having two terms for the strain in a rosette of strain gauges, the combination comprising a plurality of amplifiers each connected to one of said strain gauges for producing a plurality of identical electrical voltages proportional to the strain on each gauge of the rosette, circuit means for attenuating and algebraically combining certain proportions of said plurality of electrical voltages representative of said strain gauges to obtain a first resultant voltage proportional to the first term of said equation, circuit means for attenuating and algebraically combining certain proportions of said plurality of electrical voltages representative of said strain gauges to obtain for each gauge a second resultant voltage which is proportional to a part of the second term of said equation, electrodynamic means for combining said second resultant voltages by squaring each resultant voltage and adding said squared voltages, means for generating an electrical voltage for electrodynamically opposing said electrodynamically combined voltages to obtain a third resultant voltage equal to the square root of the algebraic sum of said squared second resultant voltages, circuit means for combining algebraically said third resultant voltage with said first resultant voltage to produce a fourth resultant voltage, and means for comparing said fourth resultant voltage with a reference voltage to indicate the sense of the strain.

10. In an electrical system for solving an equation, the combination of electrodynamic means having a plurality of sets of coils, each for producing a torque proportional to the production of two electrical quantities, one of said sets of coils being connected to means for opposing the torque produced by the remaining coil sets and connected to a source of voltage generated by photoelectric amplifier means controlled by a mirror connected to said electrodynamic means, and circuit means for obtaining from said source an electrical quantity proportional to the square root of the sum of the electrical quantities producing said torque.

References Cited in the file of this patent

UNITED STATES PATENTS

| | | |
|---|---|---|
| 1,677,378 | Albrecht | July 17, 1928 |
| 1,857,452 | Hausman et al. | May 10, 1932 |
| 1,907,804 | Hausman et al. | May 9, 1933 |
| 2,447,517 | Manson | Aug. 24, 1948 |
| 2,478,720 | Sourwine et al. | Aug. 9, 1949 |
| 2,535,250 | Allen | Dec. 26, 1950 |

FOREIGN PATENTS

| | | |
|---|---|---|
| 565,462 | Great Britain | Nov. 10, 1944 |

OTHER REFERENCES

Automatic A.-C. Bridges, J. F. Graham; "Electronics;" vol. 24; No. 2; pp. 110–116; February, 1951.